Oct. 6, 1970   M. LE ROY NOYES ET AL   3,532,536

COATED PACKAGING MATERIAL

Filed Feb. 28, 1968

INVENTORS
MERLE L. NOYES
GLENN H. SMITH, JR.

BY *Mandeville & Schweitzer*

ATTORNEYS

United States Patent Office 3,532,536
Patented Oct. 6, 1970

3,532,536
COATED PACKAGING MATERIAL
Merle Le Roy Noyes, Frenchtown, and Glenn Harold Smith, Jr., Alpha, N.J., assignors to Riegel Paper Corporation, New York, N.Y., a corporation of Delaware
Filed Feb. 28, 1968, Ser. No. 709,050
Int. Cl. C09j 7/04; B44d 1/10
U.S. Cl. 117—68.5                                      12 Claims

ABSTRACT OF THE DISCLOSURE

The invention is directed to coated packaging materials for use in "form and fill" packaging machinery, which include substrates such as glassine, kraft paper, and various polyester packaging films, which have been coated on the side which is to become the inside of a formed package with a relatively lightweight coating of a composition which imparts outstanding heat-seal, hot tack, and grease resistance properties thereto and which have been coated on the side which is to become the outside of the formed package with a relatively heavy coating of a composition which imparts superior water vapor transmission rate (WVTR), gloss, hardness, and jaw release or anti-stick properties to the packaging material. The coating compositions are comprised predominantly of special resins, a fully reacted cyclicized rubber resin for the inside and an indene-vinyl benzene resin for the outside, with the balance of both compositions being made up of paraffin wax and a copolymer of vinyl acetate and ethylene.

CROSS REFERENCES TO RELATED APPLICATIONS

This application is related to copending application Ser. No. 541,811, filed Apr. 11, 1966 and now U.S. Pat. No. 3,467,296, for "Packaging Material and Method of Manufacturing the Same" and is related to the copending application Ser. No. 635,667, filed May 3, 1967 and now U.S. Pat. No. 3,403,048, for "Heat Sealable Moistureproof Coating Compositions and Coated Packaging Material Incorporating the Same."

BACKGROUND OF INVENTION

The present invention relates to "two sided," heat sealable moistureproof materials which are especially adapted for use in the packaging of hygroscopic contents such as potato chips, powdered food mixes, and the like in high speed automatic packaging machines of which the various "form and fill" machines are exemplary. Such machines effect package formation and filling in one location at one time and require special material which can be instantly and reliably heat sealed with minimum dwelling of the heat seal jaws and which will readily release the jaws without sticking thereto upon the completion of the formation of the package seam.

A typical "form and fill" machine for which the new materials are especially well suited may operate by first overfolding a continuous web of sheet material having an "inside" intended for internal package surfaces and an "outside" intended for external package surfaces and then continuously forming a longitudinaly extending seam (inside to outside) therein to define a continuous open-ended tube. Thereafter, the tube may be transversely sealed (inside to inside) to close off lower portions thereof; it may then be filled through the open end, advanced, and again sealed transversely (inside to inside) to restart the forming and filling cycle. Each transverse seam forms, in effect, the top of a filled package and the bottom of the next package to be filled. Of course, alternate types of "form and fill" machines are in use in which the procedure is somewhat different, however, the requirement for short dwell times and instant jaw release in seam formation is universal in this type of packaging equipment.

In order to be operated at economically feasible, very high speeds, the sealing jaws of a packaging machine must remain uncontaminated from the coatings of the packaging material and must be able to effect, without an unnecessarily long dwell and desirably at low temperatures, a seal having sufficient "hot tack," i.e., sufficient cohesiveness to remain intact under the stress of the packaged contents while the coating is still tacky and setting up without physical support after the sealing jaws have been withdrawn from the area of the seal.

SUMMARY OF THE INVENTION

The present invention relates to a new and improved, economical packaging material having vastly superior properties of resistance to water vapor transmission, "hot tack," and "non-sticking" or sealing jaw release than have been available heretofore, which material is produced at relatively low costs by "differentially and unbalancedly" coating a paper, metal foil, or plastic film substrate with compositions of the type generally including a special resin, a wax, and a heat sealable material.

Specifically, the above-identified three basic elements when "differentially" formulated (i.e., combined in different proportions and having different resins) into first and second coatings, which coatings are then applied "unbalancedly" (i.e., in unequal coat weights) to inner and outer (in terms of a finished package) sides of a substrate, provide an economical packaging material having excellent properties of hot tack for inside to inside seals, water vapor transmission resistance, and "releasability" of its outside surfaces from heat seal jaws. Ideally, the elements of the compositions for the internal side of the packaging material are cyclicized rubbers prepared by carrying to substantial completion the reaction between rubber and inorganic acid in the presence of a phenol catalyst, a high melting point wax, and a heat sealable copolymer of vinyl acetate and ethylene, a combination disclosed in copending application Ser. No. 635,667, filed May 3, 1967 and now U.S. Pat. No. 3,403,048, for "Heat Sealable Moistureproof Coating Composition and Coated Packaging Material Incorporating Same," by James H. Grimm et al. The elements for the compositions for the external side of the packaging material are similar to those employed for the internal side, with the exception of the use of an indene-vinyl benzene resin in lieu of the cyclicized rubber resin.

The coating compositions disclosed in the copending applications provide packaging substrates with excellent hot tack, water vapor transmission resistance, and jaw releasing properties. Furthermore, the packaging materials of the type disclosed in the copending applications, possess highly acceptable gloss, scuff resistance, flexibility, resistance to blocking, compatibility with pigments, etc., and such materials have found immediate and widespread acceptance in the art.

A most important aspect of the present invention is the determination that a highly economical and vastly superior moistureproof, heat sealable packaging material may be provided by applying to the inner surface of a substrate (in terms of a formed package) a relatively lightweight coating of a first composition having optimized hot tack properties and including a substantially fully reacted cyclicized rubber, a heat sealable material, and relatively small proportions of wax and applying a relatively heavy coating of a second composition having optimized jaw release properties and including a relatively inexpensive (in comparison with the cost of the fully reacted cyclicized rubber) indene-vinyl benzene resin, heat sealable material, and wax. The resultant packaging material will provide the requisite high degree of protection to packaged contents while being capable of being run through "form and fill" machinery at high speeds without fouling or interfering with the effective operation of the same.

DESCRIPTION OF THE INVENTION

Figure 1:
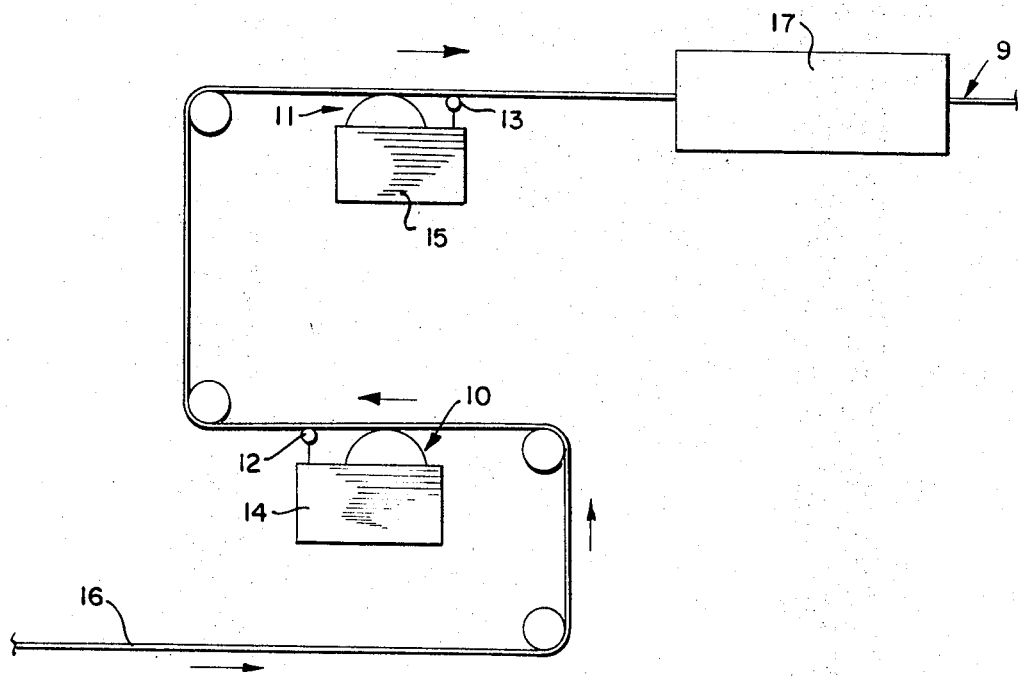
FIG. 1 is a schematic representation of the method of the invention by which the new and improved packaging material is manufactured.

The basic special resins from which the unbalanced, differential coatings of the present invention are derived include a cyclicized rubber resin which is prepared by carrying to substantial completion the reaction between rubber and an inorganic acid in the presence of a phenol catalyst, referred to herein for brevity of description as a "fully reacted cyclicized rubber," and an indene-vinyl benzene resin. The balance of the new composition includes a high melting point paraffin wax and a heat sealing modifier, preferably a copolymer vinyl acetate and ethylene. The basic combination of a fully reacted cyclicized rubber, high melting point wax, and heat sealing modifier is disclosed in the aforementioned copending application Ser. No. 635,667, to which application reference may be had for certain details not included herein.

Specifically, the special resin of the internal coating is a fully reacted cyclicized rubber (as distinguished from partially reacted cyclicized rubbers of the so-called "Pliolite" type which are more unsaturated) is manufactured in accordance with the general teachings of U.S. Pat. No. 2,200,715. Such a rubber is commercially available from Reichhold Chemical, Inc., under the trade designation "RCI 92-154." More specifically, it is prepared by dissolving No. 1 thick pale crepe rubber in heated phenol to which has been added phosphoric acid as the cyclization catalyst. After the reaction has progressed to substantial completion, the reaction mixture is cooled and mineral spirit is added, followed by repeated water washing to eliminate substantially all of the phenol. Finally, the mineral spirit is distilled off and the product blown with live steam until the condensate is solvent-free and gives a negative phenol test (ferric chloride). The substantially fully reacted cyclicized rubber resulting from this process is a hard, tough, horn-like resinous polymer having the following approximate properties and characteristics as specified by the manufacturer:

| | |
|---|---|
| Specific gravity: 25° C. | 1.00 |
| Wt. per gal.—25° C. | 8.33 |
| Bulking value—25° C. | 0.120 |
| Index of refraction—25° C. | 1.535 |
| Color, U.S.D.A., rosin scale | M |
| Melting point, B & R method, ° C. | 145–165 |
| Melting point, capillary method, ° C. | 125–135 |
| Molecular weight, average | 5,000–10,000 |
| Iodine number | 75–95 |
| Acid value | 0–1 |
| Saponification value | 0 |
| Burning rate | Very slow |
| Dielectric constant, 1000 cy. | 1.35–1.50 |
| Specific surface resistance, ohm | $10^{17}$ |
| Hardness, sward | 50–60 |

The resin component of the external coating is an indene-vinyl benzene resin of the type commercially available from the Neville Chemical Company under the trade designation "Nevex 100." These resins are readily completely soluble in aliphatic and aromatic solvents and possess the following approximate properties and characteristics, as specified by the manufacturer:

| | |
|---|---|
| Specific gravity at 25/15.6° C. | 1.12 |
| Weight/gal., lbs. | 9.3 |
| Softening point, R & B, ° C. | 99 |
| Color, Neville | 1 |
| Gardner, 50% in toluene | 10 |
| Viscosity, Gardner at 25° C.: | |
| 70% in toluene, bubble-seconds | 2.65 (J–K) |
| 70% in mineral spirits, bubble-seconds | 22.0 (Z) |
| Acid number | Nil |
| Ash, wt. percent | Trace |
| Refractive index at 25° C. | 1.620 |

The heat seal modifiers employed in the coatings of the invention are preferably those vinyl acetate-ethylene copolymers which are available commercially under the trade designations "Elvax 250" (28% vinyl acetate) and "Elvax 460" (18% vinyl acetate) from the E. I. du Pont de Nemours & Co., Inc. Elvax 250 and 460 possess the following approximate properties and characteristics, as specified by the manufacturer:

| | Elvax 460 | Elvax 250 |
|---|---|---|
| Vinyl acetate content, wt. percent | 18 | 28 |
| Inherent viscosity at 30° C. (0.25 g./100 ml. toluene) | 0.98 | 0.85 |
| Melt index, g./10 min. (ASTM D-1238, modified) | 2.5 | 15 |
| Odor | Slight | Slight |
| Tensile Strength, p.s.i. (ASTM D-8221) | 2,750 | 2,000 |
| Elongation at break, percent (ASTM D-8221) | 850 | 750 |
| Density, g./cc. at 23° C. (ASTM D-1505) | 0.941 | 0.95 |
| Refractive index, $n_D^{25}$ | 1.492 | 1.485 |
| Softening point, ring and ball, ° F. (ASTM E-28) | 390 | 276 |

It should be understood that other heat sealing modifiers may also be used in the practice of the invention. These include, for example, Elvax 260 (28% vinyl acetate); Elvax 40 (40% vinyl acetate); XYHL Polyvinyl Butyral, manufactured by Union Carbide Co.; AYAF Polyvinyl Acetate (softening point 77° C.), manufactured by Union Carbide Co.; AYAT Polyvinyl Acetate (softening point 87.5° C.), manufactured by Union Carbide Co.; Vinylite VMCH, a Vinyl Acetate-Vinyl Chloride Copolymer (13% vinyl acetate), manufactured by Union Carbide Co.; Vinylite VAGH Vinyl, an Acetate-Vinyl Chloride Copolymer (3% vinyl acetate), manufactured by Union Carbide Co.; Ester Gum 8–L Glycerol Ester of Rosin, manufactured by Hercules Powder Co.; and Dow 276 V–2 poly-alpha-methyl styrene, manufactured by Dow Chemical Co.

The wax which is employed in both coatings with the resins and the heat seal modifiers, is advantageously a paraffin wax having a melting point of 136–140° F. For example, a wax sold by the Sun Oil Company under the trade designation "Sun 4312" Paraffin Wax has provided excellent results. However, Microcrystalline, vegetable, and like waxes may also be used with comparable results, although the high melting point paraffin wax is preferred for the especially desirable water vapor transmission resistance it provides.

In accordance with the principles of the invention, a new and improved moistureproof and heat sealable packaging material 9 is manufactured by preparing solvent solutions of optimized internal and external (in terms of a finished package) coating compositions. While conventional solvent coating techniques are usually the easiest methods of applying these coatings and are therefore preferred, either coating, especially the external coating, may be applied by existing, known hot melt techniques. The alternative hot melt application techniques, of course, eliminate the use of solvents and their potential fire hazards, but all hot melt applications present other problems, such as oxidation of the coating compositions when they are heated to reduce viscosity, etc. The optimized coatings are applied in optimized unbalanced weights to a substrate of glassine, bleached kraft paper, cellophane, polyethylene, polypropylene, aluminum foil, polyethylene terephthalate, or like polyester films, metal foils, paper materials, or combinations thereof in a single pass through the coating equipment. Both the internal and external compositions are prepared in a toluene solution which is approximately 20–25% solids. Solids contents greater than 20–25% may be desirable in some applications to reduce drying requirements; however, uniformity and quality of the applied coatings is more easily maintained with the aforementioned 20–25% solids level.

By way of specific example, the following preferred internal and external coating formulations have been found to provide substantially optimum properties of heat seal, hot tack, water vapor transmission resistance, gloss, and odor when sequentially applied in respectively lighter and heavier coat weights without an intermediate forced drying step to opposite sides of a glassine substrate having a basis weight of from 24–40 pounds per ream.

Internal coating: Parts by weight
Substantially fully reacted cyclicized rubber
 (RCI 92–154) _____ 55
Vinyl acetate-ethylene copolymer (18% vinyl
 acetate—Elvax 460) _____ 35
High melting point paraffin wax (Sun 4312) 20
Toluene _____ Approx. 1270

External coating:
Indene-vinyl benzene resin (Nevex 100) ___ 55
Vinyl acetate-ethylene copolymer (28% vinyl
 acetate—Elvax 250) _____ 35
High melting point paraffin wax (Sun 4312) 30–65
Toluene _____ Approx. 1380

More specifically, knife coaters 10, 11 of the so-called Mayer type, having rotating rods 12, 13 in the apices, are used to apply the internal coating 14 and the external coating 15, respectively, to the opposite sides of a substrate 16. The rod 12 is covered by a closely wound small sized wire while the rod 13 is covered by a closely wound large sized wire, it being well known in the art that the larger the size of the wire winding on the rod the heavier will be the coating applied and vice versa.

In accordance with the invention, the internal coating composition 14 having relatively small amounts of wax (only 20 parts) compared to the larger quantities of rubber resin (55 parts) and heat seal modifier (35 parts) is applied to a moving 30 pound glassine substrate 16 in relatively light weights of 1½ pounds per ream (3,000 sq. ft.). Although this light weight of low wax content composition may be applied in weights slightly in excess of or slightly less than 1½ pounds per ream, it has been determined that the 1½ pounds weight approximates the substantial, practical minimum which may be applied without introducing stringent manufacturing tolerances.

After having been coated with the internal composition 14 which provides "outstanding" hot tack, heat seal, grease resistance properties, the substrate 16 is then directed to the second coating station 11 where it is coated with the external coating composition 15 which is applied in substantially heavier weights, that is, in the range of approximately 3 to 5½ pounds per ream (3,000 sq. ft.) in comparison to the weight of the internal coating. Thus it should be understood that the external coating 15 is unbalanced weightwise with respect to the internal coating 14 as well as being differentiated from the coating 14 by its substantially increased wax content (the external coating having 50–250% more wax than the internal coating) and different special resin. As an important aspect of the invention, the external coating 15 provides the new material 9 with optimized resistance to water vapor transmission (e.g., values of 0.05 flat and 0.15 creased, as determined by TAPPI Method T 464 M–45), excellent gloss, good odor, and superior "jaw release" or "antistick" properties. In accordance with the invention, the internal and external coatings 14, 15 are readily heat sealable to one another and will form readily acceptable inside and outside seams in "form and fill" packaging machinery.

To complete the manufacture of the new packaging material 9, the substrate 16 is directed through a dryer 17 to drive off the toluene solvent. As will be appreciated, the finished packaging material may be aptly characterized as being "differentially, unbalancedly coated."

The new material 9 having superior moistureproof properties is especially useful in packaging potato chips and like hygroscopic foodstuffs F, since it prevents the chips from becoming soggy while on the shelf. Furthermore, by virtue of its excellent "hot tack" and "jaw release" properties, the new material is especially suited for use with "form and fill" machinery.

Figure 2:
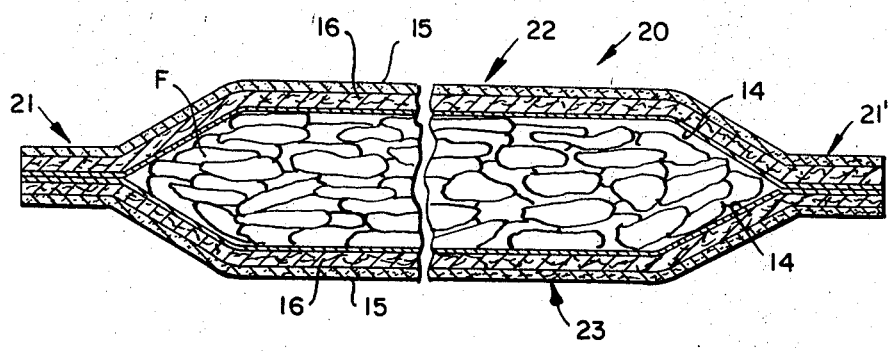
FIG. 2 is a package formed from the new material.

For example, the filled package 20 shown in FIG. 2 in a horizontal position, may be formed on a "form and fill" machine of the type described hereinabove. Thus an open tube having opposed walls 22, 23 will be established (by sealing an internal surface to an external surface of the material 9) and supported in the machine in a vertical position. Application of heat sealing pressure through heated jaws (not shown) applied against the outer surfaces of the packaging material forms a transverse seam 21 by activating and uniting the opposed internal coatings 14. As a very important aspect of the invention, the seam 21 may be established with an absolute minimum of dwell of the jaws and at comparatively low temperatures of 140–150° F. Moreover, the new material is heat sealable without sticking and without any pick up of the external coating 16 at higher jaw temperatures of 230–250° F., for example. Thus it should be appreciated that absolute freedom of contamination of the jaw, i.e., vastly superior jaw release than heretofore available with this type of packaging material, throughout a wide latitude of sealing jaw temperatures is a most important and beneficial result of the "unbalanced, differential" coatings 14, 15.

Immediately after the seam 21 is formed and before the activated, cohered coating 14 in the area of the seam 21 has had a chance to set permanently, the foodstuff F is introduced into the tube through the upper, still open end of the vertically disposed tube. Thereafter, the package 20 is completed by advancing the tube to a position in which the jaws may be closed to form another transverse seam 21′. While this operation is being effected, the seam 21 safely supports the load of the contents F, without risk of disruption, due to the excellent "hot tack" properties of the internal coating 14. Absent the superior "hot tack" properties, it would be necessary for the jaws to be operated at undesirably high temperatures and/or to dwell for a relatively long time during which the formed heat seal was allowed to reach a permanent set. Since a long dwell greatly reduces the rate of "forming and filling," it will be appreciated that the new material enables "form and fill" machinery to be operated at maximum speeds (e.g., 60 packages per minute at jaw temperatures of 140–150° F.). Moreover, since the new material may be effectively and quickly sealed at low temperatures, sealing jaw life is greatly extended through the reduction of heat fatigue, warping, etc.

The above described "form and fill" operations produce a strip of packages which may be separated from one another merely by severing, it being understood that while in strip form the seams 21, 21′ will be of twice the illustrated length. In other words, each transverse seam formed on the machine will comprise in part the top of one package and in part the bottom of the next successively formed package.

From the foregoing, it should be apparent the new packaging material with its differential, unbalanced coatings of special resin-wax-heat seal modifier compositions provides an optimized material for packaging hygroscopic materials on "form and fill" machinery. The extremely low rates of water vapor transmission (WVTR) ensure that the packaged contents, such as potato chips, nuts, food mixes and the like, will not be deleteriously affected by the passage of moisture through the walls of a package. Moreover, the elements of the coating composition are in nowise harmful to foodstuffs and are of economically feasible costs. Furthermore, the vastly superior hot tack and heat seal properties of the internal surfaces of the material along with the vastly superior jaw release or non-stick properties of the external surfaces of the material make its use in automatic packaging machinery virtually foolproof and allow the machinery in which it is employed to be operated at practical maximum speeds and at advantgeously low sealing temperatures.

It will be appreciated that the method of the present invention provides a new and improved packaging material which is differentially and unbalancedly coated. The new material is comparatively inexpensive and possesses excellent "hot tack," water vapor transmission, and "jaw release" properties.

Furthermore, it should be understood that the specific formulation and examples disclosed hereinabove are representative only and that reference should be made to the following appended claims in determining the full scope of the invention.

We claim:
1. A packaging material for use in form and fill packaging machinery and the like, comprising
   (a) a flexible substrate;
   (b) a first coating applied to the surface of said substrate adapted for external surfaces of a fabricated package;
   (c) a second coating having heat sealing properties applied to the opposite surface of said substrate;
   (d) said first coating including an indene-vinyl benzene as the principal constituent;
   (e) said second coating including a highly saturated cyclicized rubber having an iodine number not in substantial excess of 95 as the principal constituent;
   (f) the balance of each of said first and second coatings being comprised substantially of a high melting point wax and a copolymer of vinyl acetate and ethylene;
   (g) said first coating including approximately 55 parts by weight of said indene-vinyl benzene resin, approximately 35 parts by weight of said copolymer of vinyl acetate and ethylene and from approximately 30 to approximately 65 parts by weight of said wax;
   (h) said first coating being applied to said substrate in greater amounts, by weight, than said second coating.
2. The packaging material of claim 1, in which
   (a) said flexible substrate is paper, foil, film or a combination thereof.
3. The packaging material of claim 2, in which
   (a) said second coating comprises approximately 55 parts by weight of cyclicized rubber resin, approximately 35 parts by weight of vinyl acetate ethylene copolymer, and approximately 20 parts by weight of wax.
4. The packaging material of claim 3, in which
   (a) said second coating is applied in amounts of approximately 1.5 pounds per ream (3,000 sq. ft.);
   (b) said first coating is applied in amounts of approximately 3 to 5.5 pounds per ream (3,000 sq. ft.);
   (c) said substrate is glassine.
5. The packaging material of claim 1, in which
   (a) said indene-vinyl benzene resin has the following approximate characteristics:

| | |
|---|---|
| Specific gravity at 25/15.6° C. | 1.12 |
| Weight/gal., lbs. | 9.3 |
| Softening point, R&B, ° C. | 99 |
| Color, Neville | 1 |
| Gardner, 50% in toluene | 10 |
| Viscosity, Gardner at 25° C.: | |
| 70% in toluene, bubble-seconds | 2.65 (J–K) |
| 70% in mineral spirits, bubble-seconds | 22.0 (Z) |
| Acid number | Nil |
| Ash, wt. percent | Trace |
| Refractive index at 25° C. | 1.620 |

6. A packaging material adapted for use in form and fill machinery, comprising
   (a) a flexible substrate selected from the group comprising paper, film, and foil;
   (b) an external coating based principally upon an indene-vinyl benzene resin;
   (c) an internal coating based principally upon a cyclized rubber;
   (d) the substantial balance of both of said internal and external coatings comprising high melting point paraffin wax and a resin having heat sealing properties;
   (e) said resin having heat sealing properties being chosen from the group consisting of copolymers of ethylene and vinyl acetate, polyvinyl butyral, polyvinyl acetate, copolymers of vinyl acetate and vinyl chloride, glycerol esters of rosin and poly alpha methyl styrene;
   (f) said external coating including approximately 55 parts by weight of said indene-vinyl benzene resin, approximately 35 parts by weight of said resin having heat sealing properties and from approximately 30 to approximately 65 parts by weight of said wax;
   (g) said external and internal coatings being applied to opposite sides of said substrate in comparatively heavy and light weight, respectively.
7. The packaging material of claim 6 in which
   (a) said internal coating includes less wax, by weight, than said external coating.
8. The packaging material of claim 6, in which
   (a) the weight ratio of said cyclicized rubber to said resin having heat sealing properties is approximately 55:35.
9. The packaging material of claim 6, in which
   (a) said indene-vinyl benzene resin is further characterized by the following properties:

| | |
|---|---|
| Specific gravity at 25/15.6° C. | 1.12 |
| Weight/gal., lbs. | 9.3 |
| Softening point, R&B, ° C. | 99 |
| Color, Neville | 1 |
| Gardner, 50% in toluene | 10 |
| Viscosity, Gardner at 25° C.: | |
| 70% in toluene, bubble-seconds | 2.65 (J–K) |
| 70% in mineral spirits, bubble-seconds | 22.0 (Z) |
| Acid number | Nil |
| Ash, wt. percent | Trace |
| Refractive index at 25° C. | 1.620 |

(b) said cyclicized rubber is further characterized by the following properties:

| | |
|---|---|
| Specific gravity: 25° C. | 1.00 |
| Wt. per gal.—25° C. | 8.33 |
| Bulking value—25° C. | 0.120 |
| Index of refraction—25° C. | 1.535 |
| Color, U.S.D.A., rosin scale | M |
| Melting point, B&R method, ° C. | 145–165 |
| Melting point, capillary method, ° C. | 125–135 |
| Molecular weight, average | 5,000–10,000 |
| Iodine number | 75–95 |
| Acid value | 0–1 |
| Saponification value | 0 |
| Burning rate | Very slow |
| Dielectric constant, 1000 cy. | 1.35–1.50 |
| Specific surface resistance, ohm | $10^{17}$ |
| Hardness, sward | 50–60 |

10. The packaging material of claim 6, wherein
    (a) said resin having heat sealing properties is a copolymer of ethylene and vinyl acetate.
11. A flexible packaging material, comprising
    (a) a paper-like substrate;
    (b) a first coating on a surface of said substrate; and
    (c) a second coating having heat sealing properties on the opposite side of said substrate;
    (d) said first coating comprising approximately 55 parts by weight of an indene-vinyl benzene resin, approximately 35 parts by weight of a copolymer of ethylene and vinyl acetate, and approximately 30 to approximately 65 parts by weight of a high melting point wax, (e) said first coating being applied to said substrate in greater amounts, by weight, than said second coating.

12. The packaging material of claim 11, wherein
(a) said first coating is applied to said substrate in amounts of approximately 3 to 5.5 pounds per ream (3,000 square feet) of substrate.

References Cited

UNITED STATES PATENTS

| | | | |
|---|---|---|---|
| 3,223,535 | 12/1965 | Rosser | 117—68.5 X |
| 3,326,708 | 6/1967 | Hawkins | 117—68.5 X |
| 3,403,048 | 9/1968 | Grimm et al. | 117—145 X |

WILLIAM D. MARTIN, Primary Examiner

B. D. PIANALTO, Assistant Examiner

U.S. Cl. X.R.

99—171; 117—122, 138.8, 155, 158, 161; 206—46; 229—3.5; 260—28.5, 88.2